(12) United States Patent
Nakamura et al.

(10) Patent No.: US 11,754,465 B2
(45) Date of Patent: Sep. 12, 2023

(54) OPTICAL PULSE TESTING DEVICE AND OPTICAL PULSE TESTING METHOD

(71) Applicant: NIPPON TELEGRAPH AND TELEPHONE CORPORATION, Tokyo (JP)

(72) Inventors: Atsushi Nakamura, Musashino (JP); Nazuki Honda, Musashino (JP); Daisuke Iida, Musashino (JP); Hiroyuki Oshida, Musashino (JP); Keiji Okamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 176 days.

(21) Appl. No.: 17/426,631

(22) PCT Filed: Sep. 4, 2019

(86) PCT No.: PCT/JP2019/034867
§ 371 (c)(1),
(2) Date: Jul. 28, 2021

(87) PCT Pub. No.: WO2020/158033
PCT Pub. Date: Aug. 6, 2020

(65) Prior Publication Data
US 2022/0120635 A1    Apr. 21, 2022

(30) Foreign Application Priority Data

Jan. 29, 2019 (JP) ................. 2019-013566

(51) Int. Cl.
*G01M 11/00* (2006.01)
(52) U.S. Cl.
CPC .... *G01M 11/3127* (2013.01); *G01M 11/3145* (2013.01); *G01M 11/3154* (2013.01)

(58) Field of Classification Search
CPC ............ G01M 11/31; G01M 11/3109; G01M 11/3118; G01M 11/3127; G01M 11/3136;
(Continued)

(56) References Cited

FOREIGN PATENT DOCUMENTS

| JP | S63236938 A | 10/1988 |
|----|----|----|
| JP | 2878778 B2 * | 4/1990 |

(Continued)

OTHER PUBLICATIONS

Mitsuhiro Tateda and Tsuneo Horiguchi, Water Penetration Sensing Using Wavelength Tunable OTDR, IEEE Photonics Technology Letters, vol. 3, No. 1, 1991, pp. 1-3.
(Continued)

*Primary Examiner* — Gordon J Stock, Jr.
(74) *Attorney, Agent, or Firm* — Harness, Dickey & Pierce, P.L.C.

(57) ABSTRACT

An object of the present invention is to provide an optical pulse test apparatus and an optical pulse test method that are capable of determining a change in state of an optical fiber connection portion without the need for reference and without being affected by changes in gap interval before and after the change in state. The optical pulse test apparatus according to the present invention is configured to perform an OTDR measurement by using test optical pulses having spectral widths of from several nm to several hundred nm arranged at intervals of several ten nm to several hundred nm, calculate a reflection peak value caused by the Fresnel reflection at the connection portion from the obtained OTDR waveform, and determine a state such as water immersion of the optical fiber connection portion based on the value.

6 Claims, 9 Drawing Sheets

(58) Field of Classification Search
CPC ......... G01M 11/3145; G01M 11/3154; G01M 11/3172; G01M 11/3181; G01M 11/319; G01M 3/38; G01D 5/35354; G01D 5/35358; G01D 5/35361; G01D 5/35364; G01D 5/35367; H04B 10/071
See application file for complete search history.

(56) References Cited

FOREIGN PATENT DOCUMENTS

| | | | |
|---|---|---|---|
| JP | H03296679 A | | 12/1991 |
| JP | 2006126159 A | * | 5/2006 |
| JP | 2007278870 A | * | 10/2007 |
| JP | 2013096734 A | * | 5/2013 |
| WO | WO-2019172276 A1 | * | 9/2019 ......... G01D 5/35358 |
| WO | WO-2021171598 A1 | * | 9/2021 |

OTHER PUBLICATIONS

Russell Ellis, Explanation of Reflection Features in Optical Fiber as Sometimes Observed in OTDR Measurement Traces, Corning Optical Fiber White Papers, WP1281, Nov. 2015, pp. 1-5.

* cited by examiner

OPTICAL PULSE TESTING DEVICE AND OPTICAL PULSE TESTING METHOD

CROSS-REFERENCE TO RELATED APPLICATIONS

This application is a 371 U.S. National Phase of International Application No. PCT/JP2019/034867 filed on Sep. 4, 2019, which claims priority to Japanese Application No. 2019-013566 filed on Jan. 29, 2019. The entire disclosures of the above applications are incorporated herein by reference.

TECHNICAL FIELD

The present disclosure relates to an optical pulse test apparatus and an optical pulse test method for detecting a connection state of an optical fiber transmission line.

BACKGROUND ART

As an optical fiber test technique, an optical pulse test method (Optial Time Domain Reflectometer, hereinafter, referred to as OTDR) is well known. The OTDR is a method and apparatus in which a pulsed test light is incident on an optical fiber to be measured (Fiber Under Test, hereinafter, referred to as a FUT) to obtain distribution data (OTDR waveforms) based on intensities of a backscattered light of a Rayleigh scattered light originating from the test optical pulse propagating within the optical fiber and a Fresnel reflected light, and a round trip time. This technique can be used to detect and locate reflections, increase in losses, and the like that occur in optical fiber transmission lines.

Non Patent Literature (NPL) 1 proposes a method for determining water immersion of a connection portion of an optical fiber serving as a sensor portion by using the OTDR. The technique described in NPL 1 measures power of longitudinal backscattered light while changing test wavelength of the OTDR, and plots the peak value of a reflection attenuation amount caused by Fresnel reflection generated in a gap of the connection portion (hereinafter referred to as the "reflection peak value") as a function of wavelength. Since the period of variation of the reflection attenuation amount with respect to a wavelength is different between a case where the gap of the connection portion is air and a case where the gap of the connection portion is water, it is possible to determine whether or not the connection portion has immersed by comparing periods before and after immersion.

CITATION LIST

Non Patent Literature

NPL 1: M. Tatede and T. Horiguchi, "Water penetration sensing using wavelength tunable OTDR", IEEE Photon. Technol. Lett., vol. 3, no. 1, pp. 1-3, 1991.
NPL 2: R. Ellis, "Explanation of Refection Features in Optical Fiberas Sometimes Observed in OTDR Measurement Traces", Corning Optical Fiber White Papers, WP1281, https//www.corning.com/media/worldwide/coc/documents/Fiber/RC-%20White%20Papers/WP-General/WP1281_11-2015.pdf, November 2015. (searched on Dec. 21, 2018)

SUMMARY OF THE INVENTION

Technical Problem

In the technique described in NPL 1, there is a problem in that it is not possible to determine without comparing information (reference) measured before the connection portion of the optical fiber serving as the sensor portion is immersed, that is, in a case where the gap is air, and information measured after the connection portion has immersed. When comparing these, a prerequisite condition is also required in which the gap interval of the connection portion does not change before and after the water immersion.

In light of the foregoing, an object of the present invention is to provide an optical pulse test apparatus and an optical pulse test method that are capable of determining a change in state of an optical fiber connection portion without the need for reference and without being affected by changes in gap interval before and after the change in state.

Means for Solving the Problem

In order to achieve the object described above, an optical pulse test apparatus and an optical pulse test method according to the present invention is configured to perform an OTDR measurement by using test optical pulses having spectral widths of from several nm to several hundred nm arranged at intervals of several ten nm to several hundred nm, calculate a reflection peak value originating from the Fresnel reflection generated at the optical fiber connection portion from the obtained OTDR waveform, and determine a state such as water immersion of the optical fiber connection portion based on the value.

Specifically, the optical pulse test apparatus according to the present invention includes: a light incident unit configured to input test optical pulses having predetermined spectral widths on one end of an optical fiber under test, the optical fiber under test including a connection portion at which optical fibers are connected to each other; a light receiving unit configured to receive backscattered light by the test optical pulses from one end of the optical fiber under test and obtain a light intensity distribution with respect to a longitudinal direction of the optical fiber under test; and a computation unit configured to calculate a reflection peak value caused by Fresnel reflection generated at the connection portion of the optical fiber under test from the light intensity distribution, and determine a type of medium at the connection portion of the optical fiber under test, based on the reflection peak value.

An optical pulse test method according to the present invention includes: inputting test optical pulses having predetermined spectral widths on one end of an optical fiber under test, the optical fiber including a connection portion at which optical fibers are connected to each other; receiving backscattered light by the test optical pulses from one end of the optical fiber under test and obtaining a light intensity distribution with respect to a longitudinal direction of the optical fiber under test; and calculating a reflection peak value caused by Fresnel reflection generated at the connection portion of the optical fiber under test from the light intensity distribution to determine a type of medium at the connection portion of the optical fiber under test, based on the reflection peak value.

The predetermined spectral widths are preferably from several nm to several hundred nm.

There are a plurality of peaks in the wavelength characteristic of the reflection attenuation amount caused by the Fresnel reflection of the connection portion. In a case where test optical pulses with normal spectral widths are used, those peaks are extremely large and the wavelength varies with the gap interval of the connection portion, so that the medium present in the connection portion cannot be identified by the value of the reflection attenuation amount due to the influence. However, by using test optical pulses having broad spectrum widths, the peaks are reduced, and thus the medium present in the connection portion can be determined by the value of the reflection attenuation amount, which allows the problem described above to be solved.

Thus, the present invention can provide an optical pulse test apparatus and an optical pulse test method that are capable of determining a change in state of an optical fiber connection portion without the need for reference and without being affected by changes in gap interval before and after change in the state.

In the optical pulse test apparatus according to the present invention, the light incident unit sequentially inputs the test optical pulses having different center wavelengths on one end of the optical fiber under test, and the computation unit determines a type of medium at the connection portion of the optical fiber under test, based on an average value obtained by averaging the reflection peak values determined for each of the test optical pulses having different center wavelengths.

In the optical pulse test method according to the present invention, the test optical pulses having different center wavelengths are, in the inputting, sequentially input on one end of the optical fiber under test, and a type of medium at the connection portion of the optical fiber under test is determined, in the calculating, based on an average value obtained by averaging the reflection peak values determined for each of the test optical pulses having different center wavelengths.

Using test optical pulses having different center wavelengths, the reflection peak values are leveled. Thus, the medium present in the connection portion can be determined more accurately with the value of the reflection attenuation amount.

In the optical pulse test apparatus according to the present invention, the light incident unit sequentially inputs the test optical pulses having different center wavelengths on one end of the optical fiber under test, and the computation unit obtains reflectance data from the reflection peak values determined for each of the test optical pulses having different center wavelengths, and determines a type of medium at the connection portion of the optical fiber under test, based on a value obtained by logarithmically expressing a reciprocal of an average value obtained by averaging the reflectance data.

By obtaining the reflectance at the reflection peak position in the OTDR waveform at each wavelength of the test optical pulses, and transforming the reciprocal of the average value obtained by averaging the reflectance to a value expressed logarithmically, the lowest value among the reflection attenuation amount can be detected. In other words, the maximum vicinity of the wavelength dependency of the reflection attenuation amount that makes determination of the type of medium at the connection portion difficult can be avoided, and determination of the type of medium can be facilitated.

Note that the light incident unit may sequentially input the test optical pulses having different center wavelengths on one end of the optical fiber under test, and the computation unit may obtain reflectance data of the reflection peak values determined for each of the test optical pulses having different center wavelengths, and determine a type of medium at the connection portion of the optical fiber under test, based on a value obtained by logarithmically expressing a minimum value of the reflectance data.

Effects of the Invention

The present invention can provide an optical pulse test apparatus and an optical pulse test method that are capable of determining a change in state of an optical fiber connection portion without the need for reference and without being affected by changes in gap interval before and after the change in state.

DESCRIPTION OF EMBODIMENTS

Embodiments of the present invention will be described with reference to the accompanying drawings. The embodiments described below are examples of the present invention and the present invention is not limited to the embodiments described below. In the present specification and the drawings, components with the same reference signs indicate the same components.

Figure 1:
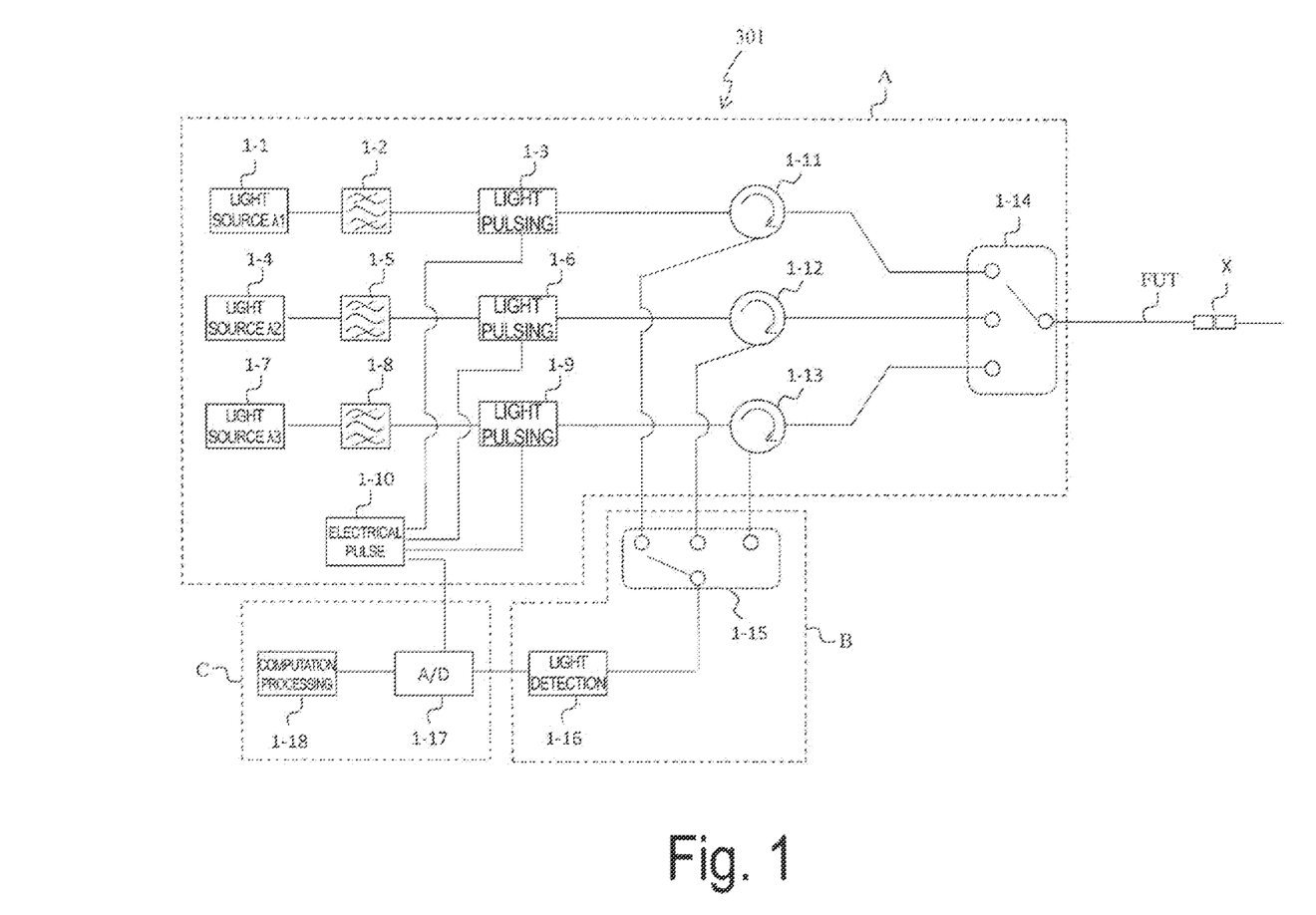
FIG. 1 is a diagram illustrating a configuration of an optical pulse test apparatus embodying the principles of the present invention.

FIG. 1 is a diagram illustrating an optical pulse test apparatus 301 according to the present embodiment. The optical pulse test apparatus 301 includes a light incident unit A, a light receiving unit B, and a computation unit C. The light incident unit A inputs a test optical pulse having a spectral width of several nm to several hundred nm to one end of an optical fiber under test FUT including a connection portion X at which optical fibers are connected to each other. The light receiving unit B receives a backscattered light by the test optical pulse from one end of the optical fiber under test FUT, and obtains a light intensity distribution of the optical fiber under test FUT in the longitudinal direction.

The computation unit C calculates a reflection peak value caused by the Fresnel reflection generated at the connection portion X of the optical fiber under test FUT from the light intensity distribution, and determines the type of medium in the connection portion X of the optical fiber under test FUT, based on the reflection peak value.

In the following description, the test wavelength has three wavelengths, but is not limited to three wavelengths.

1-1 represents a first light source having a wavelength $\lambda 1$. 1-2 represents an optical bandpass filter that cuts out light from light emitted from the first light source at a desired spectral width. 1-3 represents a first light pulsing unit for pulsing the light cut out with the bandpass filter to produce a first test optical pulse. 1-4 represents a second light source having a wavelength $\lambda 2$. 1-5 represents an optical bandpass filter that cuts out light from light emitted from the second light source at a desired spectral width. 1-6 represents a second light pulsing unit for pulsing the light cut out with the bandpass filter to produce a second test optical pulse. 1-7 represents a third light source having a wavelength $\lambda 3$. 1-8 represents an optical bandpass filter that cuts out light from light emitted from the third light source at a desired spectral width. 1-9 represents a third light pulsing unit for pulsing the light cut out with the bandpass filter to produce a third test optical pulse. 1-10 represents an electrical pulse generation unit that outputs an electrical pulse for driving the first to third light pulsing units and a trigger signal for an A/D converter. 1-11 to 1-13 represent optical circulators each of which separates backscattered light from an optical fiber under test. 1-14 represents a light switching unit that sequentially inputs the first to third test optical pulses to the FUT. 1-15 represents a light switching unit that receives backscattered light generated by the test optical pulse. 1-16 represents a light detector. 1-17 represents an A/D converter, and 1-18 represents a computation processor.

The light incident unit A includes light sources (1-1, 1-4, 1-7), optical bandpass filters (1-2, 1-5, 1-8), light pulsing units (1-3, 1-6, 1-9), optical circulators (1-11, 1-12, 1-13), a light switching unit 1-14, and an electrical pulse generation unit 1-10. The light receiving unit B includes a light switching unit 1-15 and a light detector 1-16. The computation unit C includes an A/D converter 1-17 and a computation processor 1-18.

The acquisition of an OTDR waveform for detecting the state of the optical fiber connection portion using the present apparatus will be described.

The light having a center wavelength $\lambda 1$ emitted from the first light source 1-1 is trimmed to a spectral width $\Delta\lambda 1$ by the optical bandpass filter 1-2, and then pulsed by the light pulsing unit 1-3 based on the electrical signal generated by the electrical pulse generation unit 1-10, and thus a first test optical pulse having a center wavelength $\lambda 1$ and a spectral width $\Delta\lambda 1$ is generated.

The light having a center wavelength $\lambda 2$ emitted from the second light source 1-4 is trimmed to a spectral width $\Delta\lambda 2$ by the optical bandpass filter 1-5, and then pulsed by the light pulsing unit 1-6 based on the electrical signal generated by the electrical pulse generation unit 1-10, and thus a second test optical pulse having a center wavelength $\lambda 2$ and a spectral width $\Delta\lambda 2$ is generated.

The light having a center wavelength $\lambda 3$ emitted from the third light source 1-7 is trimmed to a spectral width $\Delta\lambda 3$ by the optical bandpass filter 1-8, and then pulsed by the light pulsing unit 1-9 based on the electrical signal generated by the electrical pulse generation unit 1-10, and a third test optical pulse having a center wavelength $\lambda 3$ and a spectral width $\Delta\lambda 3$ is generated.

Figure 2:
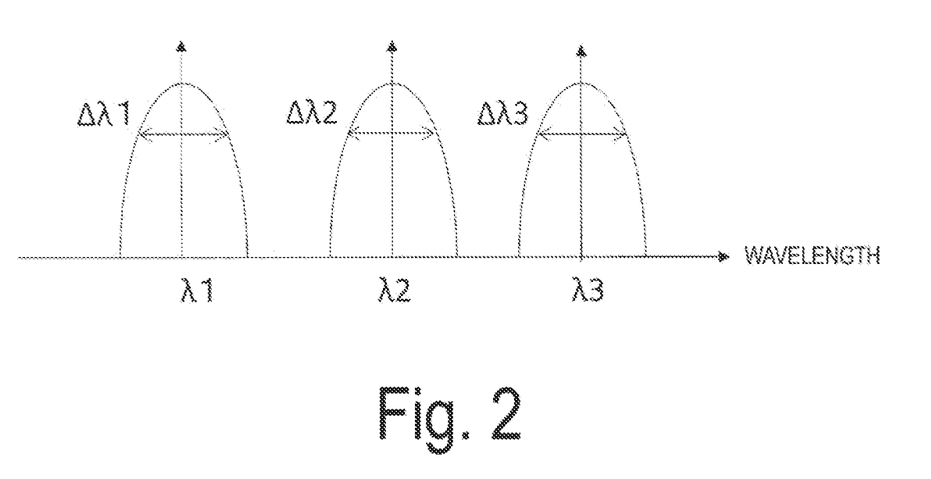
FIG. 2 is a diagram illustrating a spectral distribution of a test optical pulse used by the optical pulse test apparatus embodying the principles of the present invention.

As illustrated in FIG. 2, the first, second, and third test optical pulses having the center wavelengths $\lambda 1$ to $\lambda 3$ are arranged on the wavelength axis at intervals of, for example, several ten nm to several hundred nm, and the optical bandpass filter is adjusted such that the spectral widths $\Delta\lambda 1$ to $\Delta\lambda 3$ of the first, second, and third test optical pulses are from several nm to several hundred nm.

The first, second, and third test optical pulses can also be generated by trimming a wide band light having a spectral width of several hundred nm, such as super continuum light emitted from a single light source, by an optical bandpass filter to have a desired center wavelength and spectral width.

The light incident unit A sequentially inputs the test optical pulses having different center wavelengths on one end of the optical fiber under test FUT, and the computation unit C determines the type of medium at the connection portion of the optical fiber under test based on an average value obtained by averaging the reflection peak values determined for each of the test optical pulses having different center wavelengths.

When the first test optical pulse is incident on the optical fiber under test (FUT), Rayleigh scattering occurs in the FUT and Fresnel reflection occurs at the optical fiber connection portion, and part of them returns to the incident end as backscattered light. Backscattered light returned to the incident end of the FUT is extracted via the circulator 1-11, converted into an electrical signal by the light detector 1-16, quantified by the A/D converter 1-17, and analyzed by the computation processor 1-18.

By repeatedly measuring and averaging the backscattered light power obtained as a function of time, i.e., a distance from the incident end of the FUT, together with a trigger signal output from the electrical pulse generation unit 1-10, an OTDR waveform by the first test optical pulse is obtained.

Subsequently, the light switching units 1-14 and 1-15 are switched and the second test optical pulse is incident on the FUT to obtain the OTDR waveform data by the second test optical pulse. The same operation is repeated for the third test optical pulse to obtain the OTDR waveform data.

Figure 3:
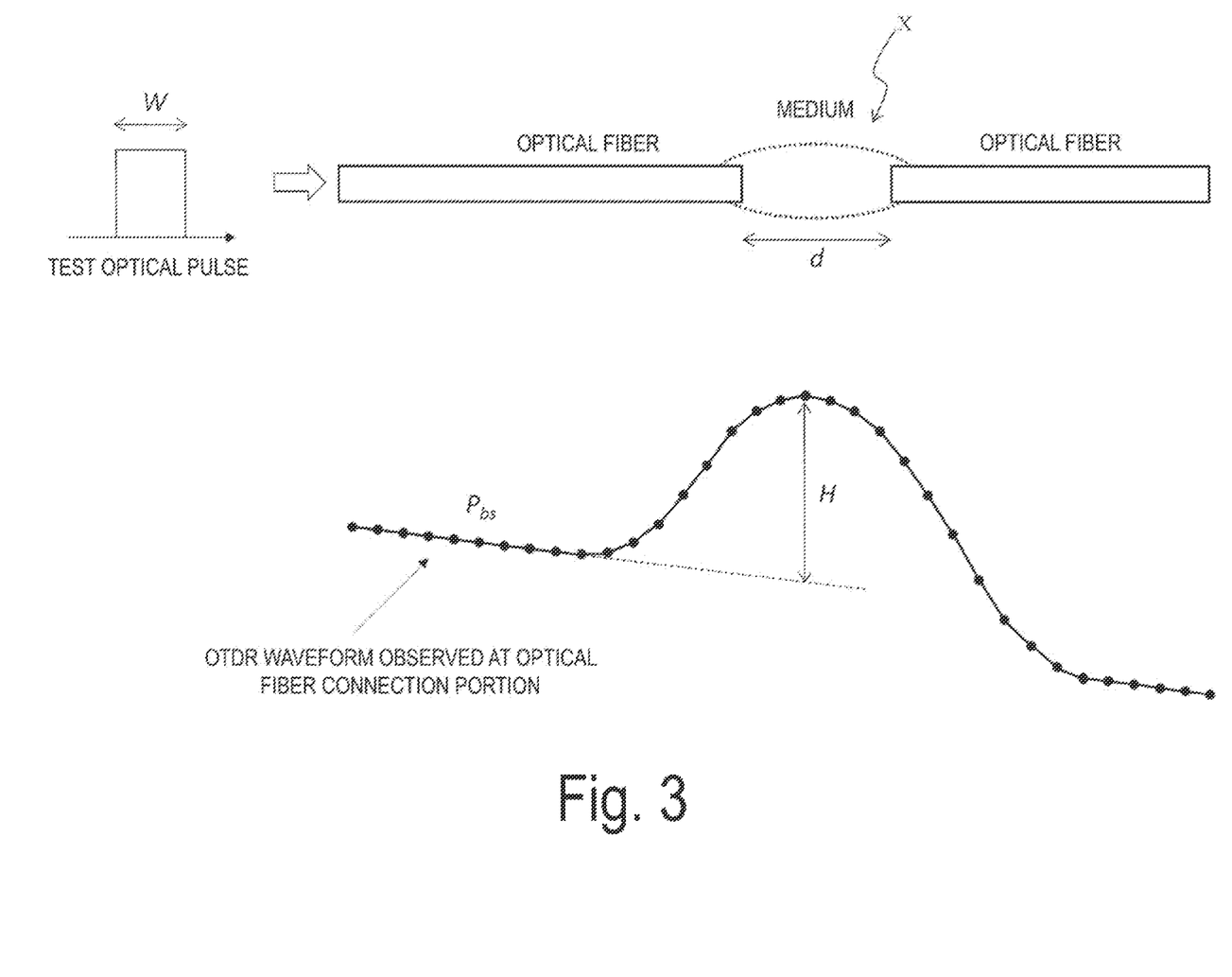
FIG. 3 is a diagram illustrating an OTDR waveform observed by the optical pulse test apparatus embodying the principles of the present invention.

In the optical fiber connection portion X of a connector connection or the like, a reflection peak by Fresnel reflection is observed in the OTDR waveform, as illustrated in FIG. 3. When the height from the back Rayleigh scattering light level $P_{bs}$ to the reflection peak, i.e. the reflection peak value, is H, the reflection peak value H is a value that depends on the refractive index n of the medium filled in the gap between the two optical fibers, the gap interval d of the two optical fibers, the wavelength $\lambda$ of the test optical pulse, and the pulse width W.

A method of determining the state of the optical fiber connection portion X from the OTDR waveform data obtained by using the optical pulse test apparatus 301 will be theoretically described.

In the optical fiber connection portion X, in a case where the end face of the optical fiber is a right angle, the Fresnel reflectance R generated at the gap sandwiched between the two optical fibers is represented as follows.

[Math. 1]

$$R = \frac{4R_0 \sin^2\left(\frac{2\pi n d}{\lambda}\right)}{(1-R_0)^2 + 4R_0 \sin^2\left(\frac{2\pi n d}{\lambda}\right)} \quad (1)$$

R0 is defined by Equation (2).

[Math. 2]

$$R_0 = \left(\frac{n_1 - n}{n_1 + n}\right)^2 \quad (2)$$

Here, $n_1$ represents the refractive index of the optical fiber, n is the refractive index of the medium filled in the gap between the two optical fibers of the connection portion X, d is the interval of the gap (gap interval), and λ is the wavelength (referred to as test wavelength) of the test optical pulse of the OTDR in a vacuum.

Computation Example 1

In the present embodiment, an example is described in which the light incident unit A sequentially inputs test optical pulses having different center wavelengths on one end of the optical fiber under test FUT, and the computation unit C determines the type of medium in the connection portion X of the optical fiber under test FUT based on an average value obtained by averaging the reflection peak values determined for each of the test optical pulses having different center wavelengths.

Figure 4:
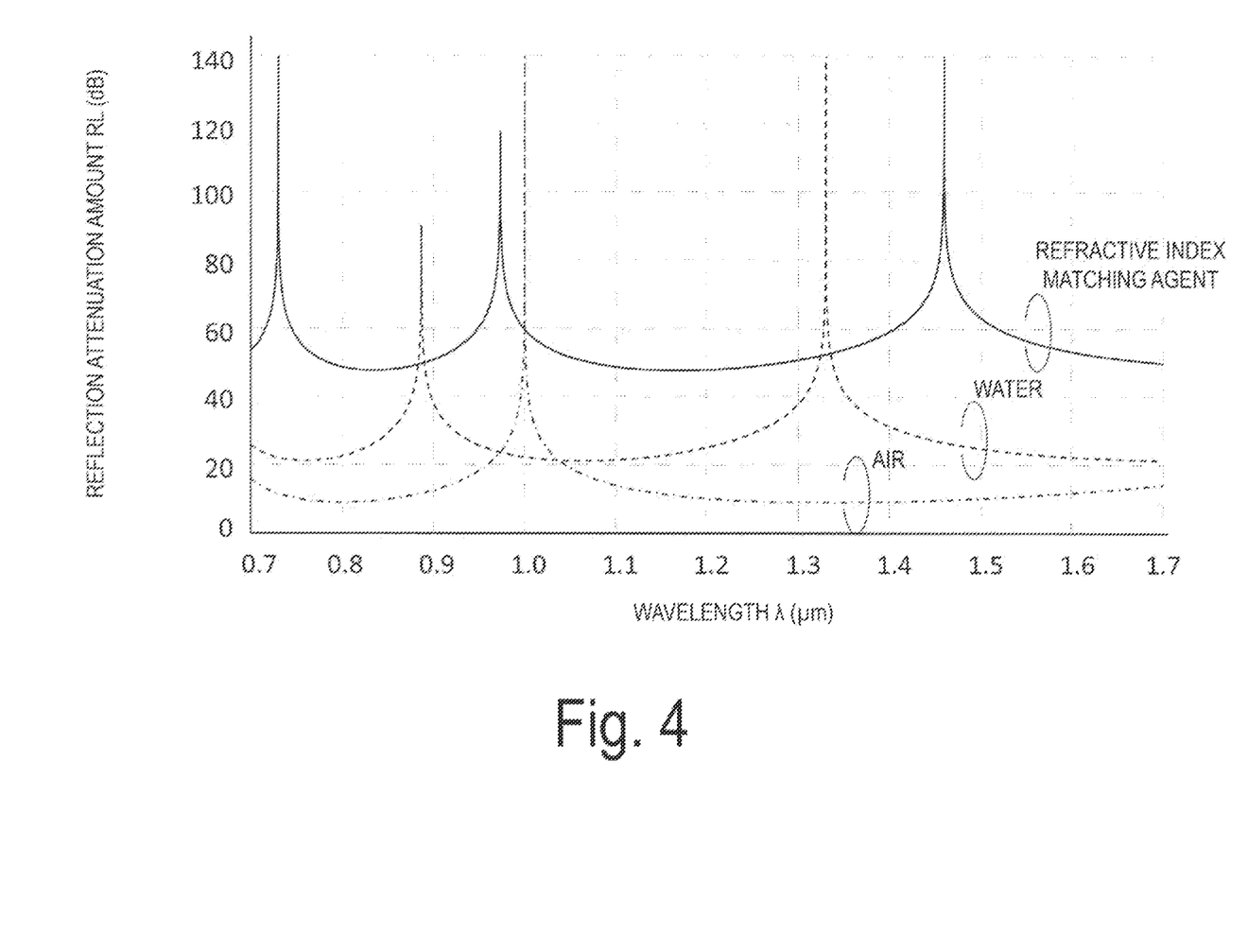
FIG. 4 is a diagram illustrating a wavelength characteristic of a reflectance at a connection portion of an optical fiber when a spectral width of a test optical pulse is zero.

FIG. 4 shows a wavelength characteristic of a reflection attenuation amount RL in each of the cases where any of a refractive index matching agent, water, and air is filled in the gap of the optical fiber connection portion X calculated by using Equations (1) and (2). The reflection attenuation amount RL is a value in which the reciprocal of the reflectance R is indicated in dB. FIG. 4 corresponds to the wavelength characteristic of the reflection attenuation amount RL when the OTDR measurement is performed with a test optical pulse having a spectral width of 0. The refractive indexes of the refractive index matching agent, water, and air are 1.46, 1.33, and 1.00, respectively, and the refractive index $n_1$ of the optical fiber is 1.454. The interval of the gap d between the two optical fibers is 1 μm. The solid line is the result of the refractive index matching agent, the dotted line is the result of water, and the dot-dash line is the result of air.

The wavelength characteristic of the reflection attenuation amount RL differs depending on the refractive index difference of the medium filled in the gap of the connection portion X. That is, overall, the reflection attenuation amount RL of the filled medium decreases in order of the refractive index matching agent, water, and air. However, because each wavelength characteristic appears periodically with a very large peak dependent on wavelength k, gap interval d, and refractive index n, it is not possible to identify a filled material even when comparing the values of the reflection attenuation amount RL at any wavelength.

Thus, in the optical pulse test method of the present embodiment, in order to reduce such effects of the wavelength, the gap interval, and the like (peaks appearing in wavelength characteristics of the reflection attenuation amount), the spectrum width of the test optical pulse is widened to several nm to several hundred nm to obtain a wavelength average of a reflection attenuation amount for each test optical pulse.

Figure 5:
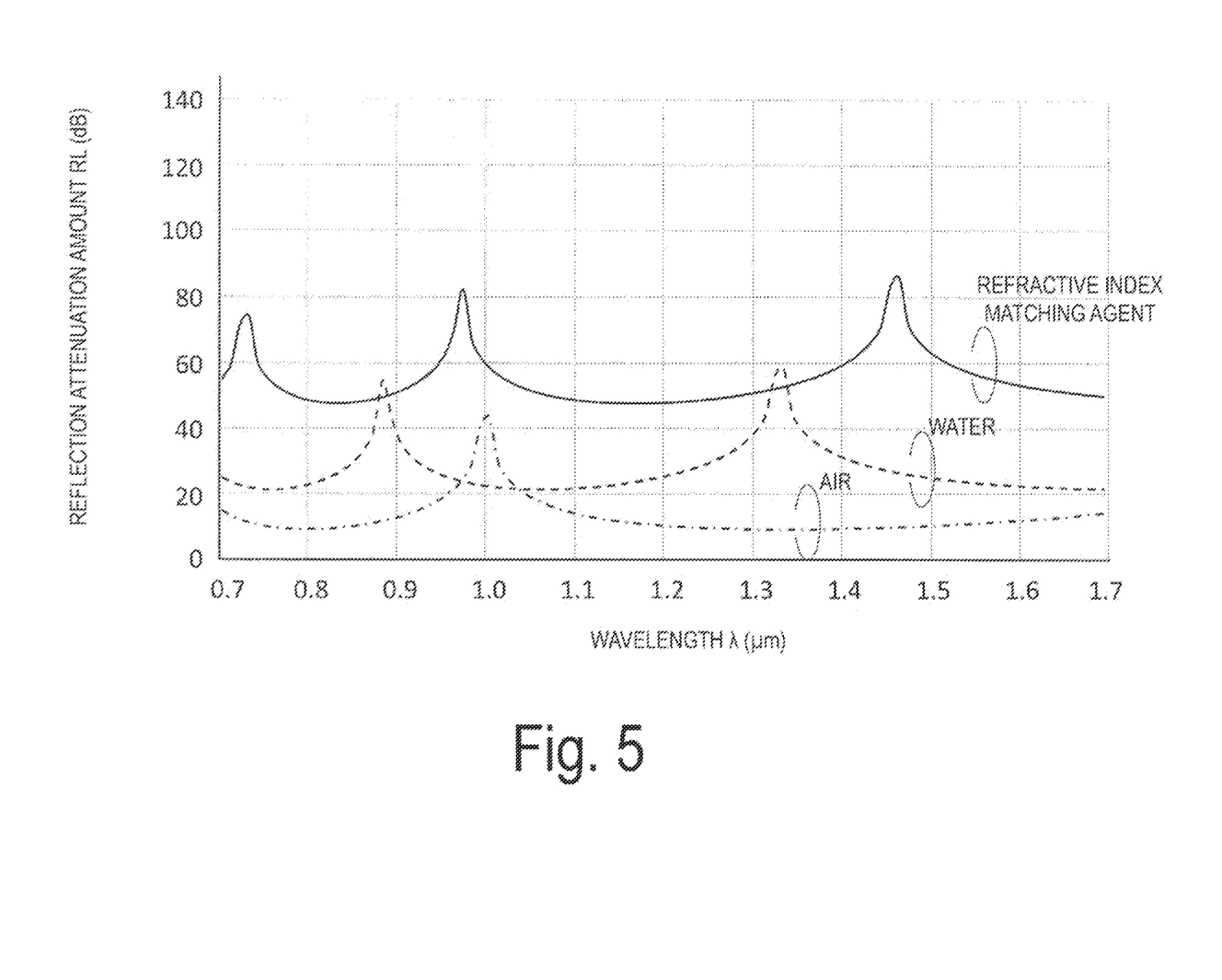
FIG. 5 is a diagram illustrating a wavelength characteristic of a reflectance at a connection portion of an optical fiber when a spectral width of a test optical pulse is 10 nm.

FIG. 5 shows the wavelength characteristic of the reflection attenuation amount RL when a wavelength average with a spectral width of 10 nm is set, i.e., when measured by a test optical pulse with a spectral width of 10 nm. Compared to the wavelength characteristic of FIG. 4, it can be seen that using a wide band test optical pulse can reduce periodic peaks.

Furthermore, by extracting the reflection peak values using test optical pulses with a wavelength of a wavelength interval of several ten nm to several hundred nm, for example, wavelengths of 1310 nm, 1490 nm, and 1650 nm, that is, by measuring the OTDR at the test wavelength 1310 nm, 1490 nm, and 1650 nm, and then averaging the reflection peak values, the reflection peak value can be leveled. The optical pulse test method of the present embodiment is a determination value for identifying a connected state of the optical fiber connection portion X of this average value that is leveled.

Figure 6:
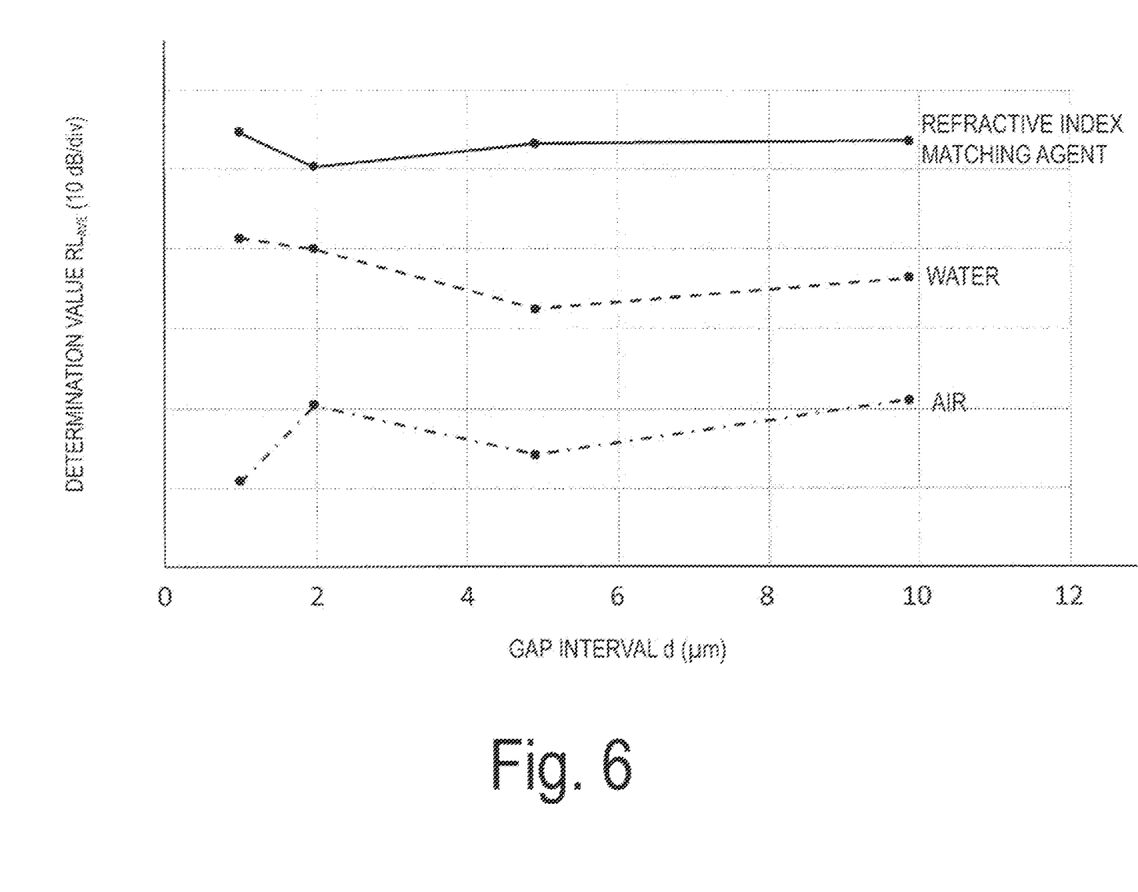
FIG. 6 is a diagram illustrating a characteristic for a gap interval of a reflection peak value obtained by the optical pulse test apparatus embodying the principles of the present invention.

The simulation results for the determination values when the gap interval changes under the above conditions (where the test wavelength is set to 1310 nm, 1490 nm, and 1650 nm, and the spectral width of each test light is 10 nm) is illustrated in FIG. 6. The solid line is the result of the refractive index matching agent, the dotted line is the result of water, and the dot-dash line is the result of air. The horizontal axis indicates the gap interval.

The range of changes in the determination value of each filling medium with respect to the changes in the gap interval does not overlap, and even in a case where the gap interval changes, a material filled in the gap of the connection portion X of the optical fiber can be easily identified.

Note that the reflection peak value H observed in the OTDR waveform is a value dependent on the pulse width W [s] of the test optical pulse, and thus, it is desirable to generalize the reflection peak value H as the reflection attenuation amount $RL^{(i)}$ [dB], for example, by using the following equation described in NPL 2 (p. 3).

[Math. 3]

$$RL^{(i)} = B - 10\log\left\{\left(10^{\frac{H(i)}{5}} - 1\right)W \cdot 10^9\right\} \quad (3)$$

Here, $H^{(i)}$ [dB] is the reflection peak value calculated from the OTDR waveform measured at the i-th test wavelength and $\lambda_i$, [dB] is the Rayleigh backscattering ratio of the optical fiber under test.

The average value $RL_{ave}$ [dB] of reflection attenuation amount $RL^{(i)}$ [dB] of N measured test wavelengths is as follows.

[Math. 4]

$$RL_{ave} = \frac{1}{N}\sum_{i=1}^{N} RL^{(i)} \quad (4)$$

By using the $RL_{ave}$ as a determination value, the water immersion state of the optical fiber connection portion X can be recognized without requiring the reference information measured before water immersion of the optical fiber connection portion X, and without being affected by the change in the gap interval.

In the embodiments of FIGS. 5 and 6, cases have been described in which the spectral width of the test optical pulse is 10 nm, and the medium filled in the gap of the optical fiber connection portion X is air, water, or refractive matching agent. In a case where the medium filled in the gap of the optical fiber connection portion X is other liquid or gas, the refractive index of the medium is different, and thus the range of the determination value $RL_{ave}$ varies. Thus, the spectral width, the number of wavelengths, and the wavelength interval of the test optical pulse need to be designed such that the range of the determination value $RL_{ave}$ does not overlap with the range of the determination value $RL_{ave}$ of a normal medium (for example, air) in accordance with the medium filled in the gap of the optical fiber connection portion X.

In this design, when the spectral width of the test optical pulse can be set wide (for example, 300 nm), the wavelength interval of the test optical pulse can be widened and the number of wavelengths can be reduced. Thus, when the spectral width of the test optical pulse is required to be set narrow (for example, 2 nm), it is only required that the wavelength interval of the test optical pulse is narrowed and the number of wavelengths is increased.

Computation Example 2

In the present embodiment, an example is described in which the light incident unit A sequentially inputs test optical pulses having different center wavelengths on one end of the optical fiber under test FUT, and the computation unit C obtains an effective reflection attenuation amount from the reflection peak values determined for each of the test optical pulses having different center wavelengths, and determines the type of medium in the connection portion X of the optical fiber under test FUT based on the effective reflection attenuation amount.

Figure 8:
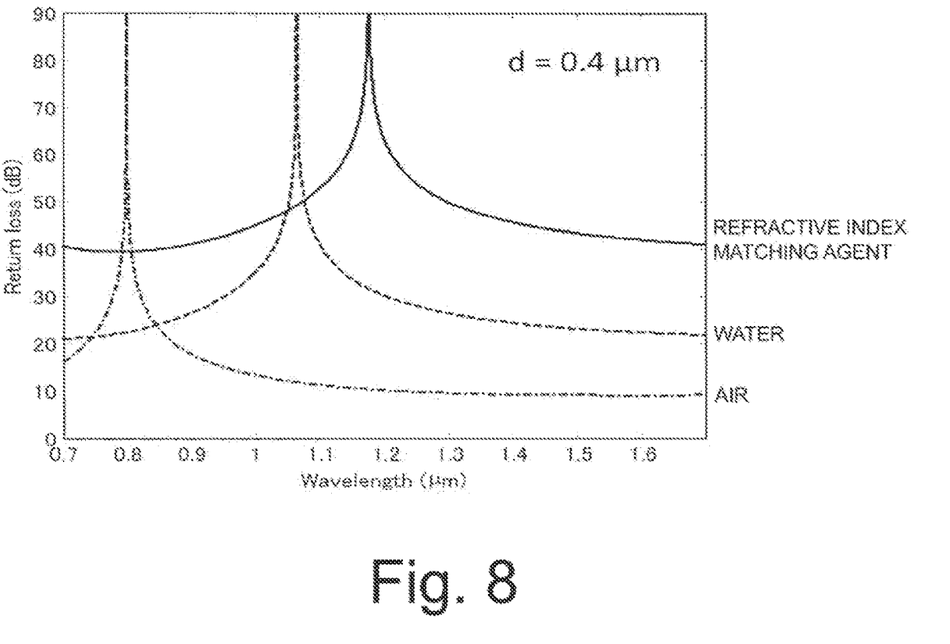
FIG. 8 is a diagram illustrating a wavelength characteristic of a reflection attenuation amount at a connection portion of an optical fiber.
Figure 9:
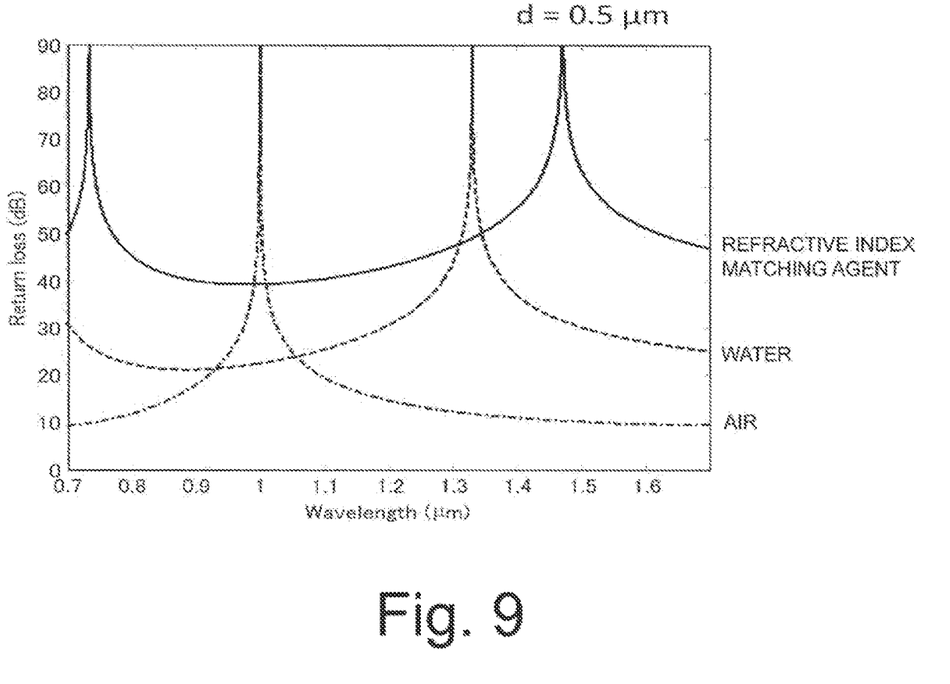
FIG. 9 is a diagram illustrating a wavelength characteristic of a reflection attenuation amount at a connection portion of an optical fiber.

FIGS. 8 and 9 show wavelength characteristics of a reflection attenuation amount RL in each case where a refractive index matching agent, water, and air is filled in the gap of the optical fiber connection portion calculated by using Equations (1) and (2). The horizontal axis is the center wavelength of the test optical pulse and the vertical axis is the reflection attenuation amount. FIGS. 8 and 9 are results in each case where the spectral width of the test optical pulse is 0 and the gap interval d is set to 0.4 μm and 0.5 μm, respectively. The reflection attenuation amount RL is a value in which the reciprocal of the reflectance R is indicated in dB. The refractive indexes of the refractive index matching agent, water, and air are 1.47, 1.33, and 1.00, respectively, and the refractive index n1 of the optical fiber is 1.454. The solid line is the result of the refractive index matching agent, the dotted line is the result of water, and the dot-dash line is the result of air.

These results show that the reflection attenuation amount RL depends on the test wavelength λ, the gap interval d, and the refractive index n. Parameters other than the test wavelength, that is, the refractive index and gap interval of a medium filled in the gap in the optical connector under test are generally unknown, and thus it is not possible to identify the filled material from the value of the reflection attenuation amount RL measured at a specific wavelength.

Thus, the inventors arrived at the following points. As shown in FIGS. 8 and 9, data outside of the neighborhood of a value where the wavelength dependency of the reflection attenuation amount is greatest takes a value close to the reflectance determined by the refractive index difference of the medium that fills the gap between the optical fiber and the connection point. Thus, when data outside of the neighborhood of a value where the reflection attenuation amount is greatest can be measured, it is possible to determine a medium that fills the gap from the value. Specifically, the optical pulse test method of the present embodiment defines an effective reflection attenuation amount that is outside of the neighborhood of a value where the reflection attenuation amount is greatest, based on the values of the reflection attenuation amount measured at a plurality of wavelengths, and determines the medium based on the effective reflection attenuation amount.

Figure 7:
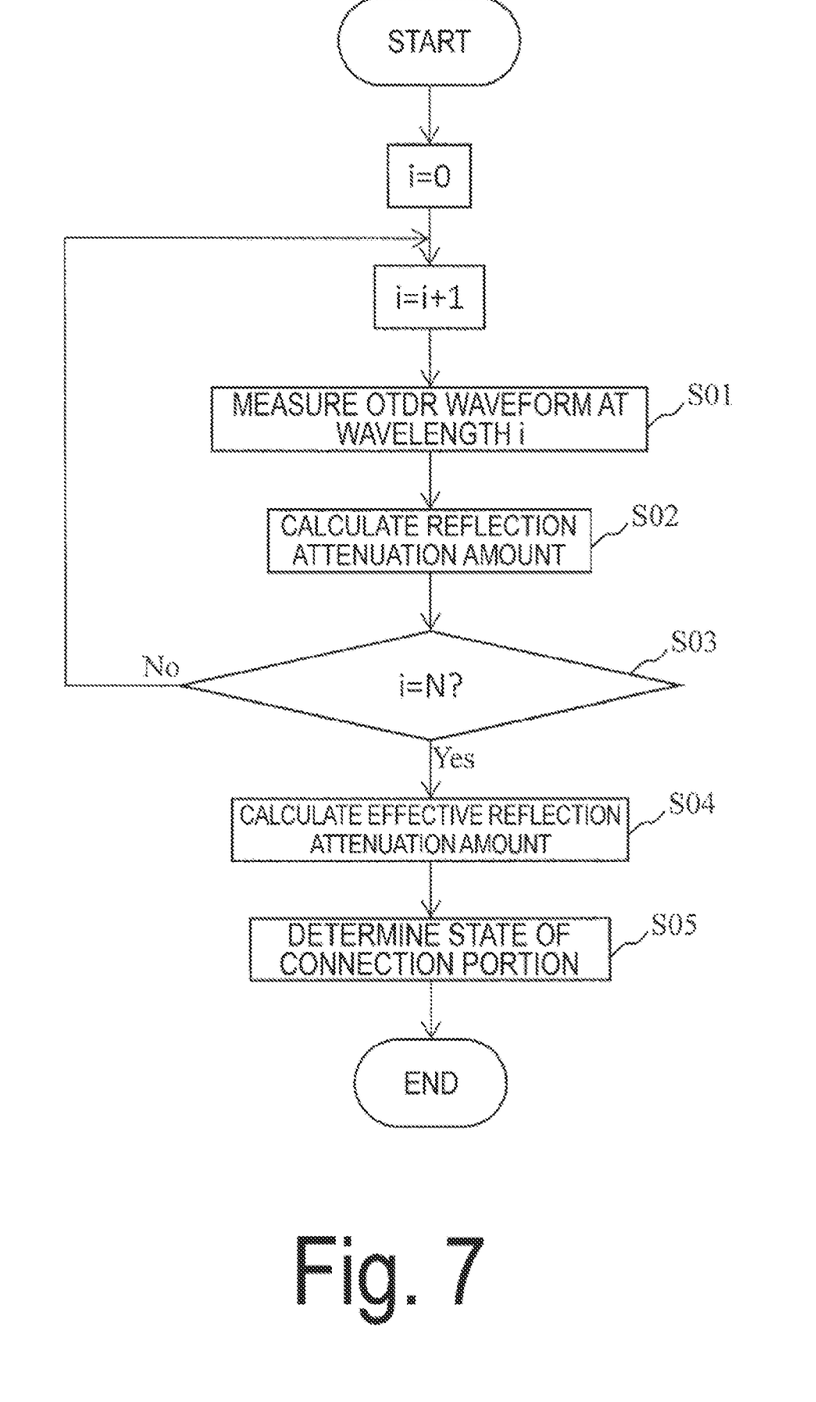
FIG. 7 is a flowchart illustrating an optical pulse test method according to the present invention.

FIG. 7 is a flowchart illustrating the optical pulse test method.

The optical pulse test method performs a light incident procedure, a light receiving procedure, and a computation procedure.

The light incident procedure inputs a test optical pulse having a predetermined spectral width to one end of the optical fiber under test FUT including a connection portion X at which optical fibers are connected to each other.

The light receiving procedure receives a backscattered light by the test optical pulse from one end of the optical fiber under test FUT, and obtains a light intensity distribution (OTDR waveform) of the optical fiber under test FUT in the longitudinal direction.

The computation procedure calculates a reflection peak value caused by the Fresnel reflection generated at the connection portion X of the optical fiber under test FUT from the light intensity distribution, and determines the type of medium in the connection portion X of the optical fiber under test FUT, based on the reflection peak value.

Note that in the light incident procedure, the test optical pulses having different center wavelengths are sequentially incident on one end of the optical fiber under test.

In other words, from steps S01 to S03 correspond to the light incident procedure performed by the light incident unit A and the light receiving procedure performed by the light receiving unit B, and from steps S04 to S05 correspond to a computation procedure performed by the computation unit C.

Here, two examples of effective reflection attenuation amount as defined by the computation unit C will be described.

First Definition

The first definition defines the effective reflection attenuation amount as the reflection attenuation amount corresponding to an average value of the reflectance at a plurality of wavelengths. The effective reflection attenuation amount according to the first definition is a value obtained by obtaining a reflectance from the reflection peak value determined for each of the test optical pulses having different center wavelengths, and logarithmically expressing the reciprocal of the average value obtained by averaging the reflectance data. Specifically, the value is as follows.

The average value $R_{eff}$ of the reflectance data obtained at a plurality of wavelengths is defined as follows.

[Math. 5]

$$R_{eff} = \frac{1}{N}\sum_{i=1}^{N} R_i(\lambda_i) \quad (5)$$

However, N represents the number of wavelengths used for the test, and $R_i(\lambda_i)$ represents the reflectance at the wavelength $\lambda_i$.

The value of the reciprocal of Equation (3) logarithmically expressed is defined as the effective reflection attenuation amount $RL_{eff}$.

[Math. 6]

$$RL_{eff} = -10 \log_{10}(R_{eff}) \quad (6)$$

Note that in the present definition, an arithmetic average of the reflectance $R_i(\lambda_i)$ needs to be performed in the linear scale. Typically, the OTDR needs to convert the value obtained in the OTDR to the reflectance in the linear scale in order to express a logarithmic reflection attenuation amount, followed by an arithmetic average of Equation (5).

The order (number of digits) of the average value of the reflectance in the linear scale is greatly dependent on the largest value in the reflectance data to be averaged, and is an equivalent number of digits to that value. However, the number of digits may be the same as the largest value, or may be lower due to taking an average. Obtaining a value of the number of digits equivalent to the largest value corresponds to obtaining the lowest reflection attenuation amount data in the measured reflection attenuation amount data when the value is logarithmically transformed and expressed as the reflection attenuation amount.

Second Definition

The second definition defines the minimum value of the reflection attenuation amount data at a plurality of wavelengths as the effective reflection attenuation amount. The effective reflection attenuation amount according to the second definition is a value obtained by obtaining the reflectance of the reflection peak value determined for each of the test optical pulses having different center wavelengths, and logarithmically expressing the minimum value of the reflectance data. Specifically, the value is as follows.

[Math. 7]

$$RL_{eff} = -10 \log_{10}\{\min[R_i(\lambda_i)]\} \quad (7)$$

Figure 10:
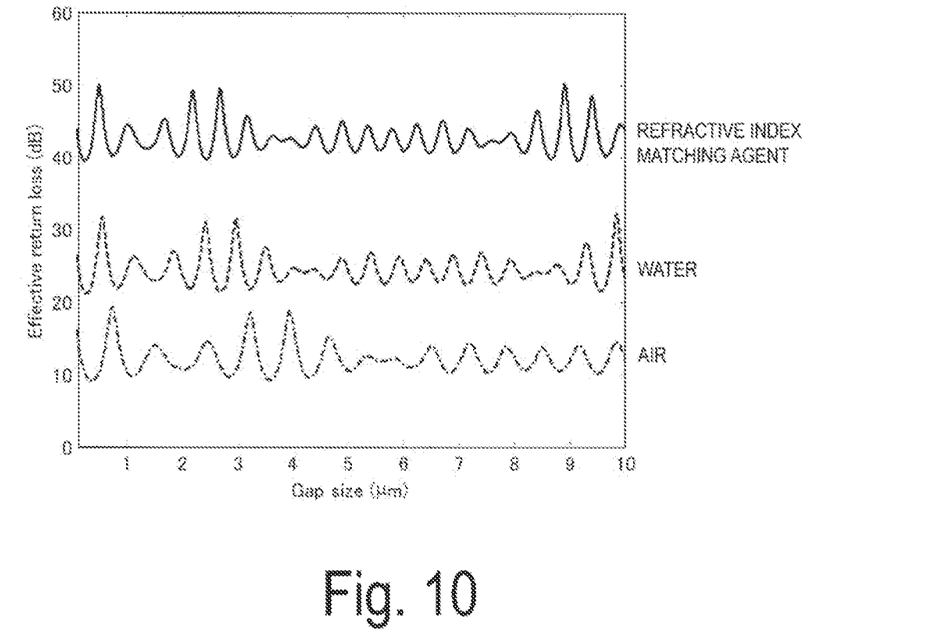
FIG. 10 is a diagram illustrating a characteristic for a gap interval of a reflection peak value obtained by the optical pulse test apparatus embodying the principles of the present invention.
Figure 11:
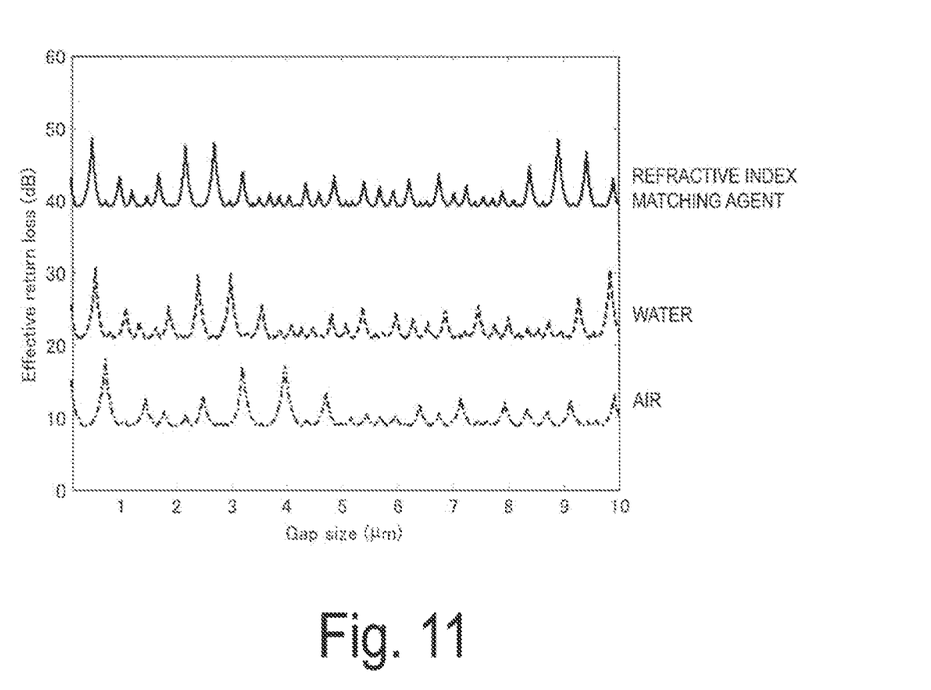
FIG. 11 is a diagram illustrating a characteristic for a gap interval of a reflection peak value obtained by the optical pulse test apparatus embodying the principles of the present invention.

FIGS. 10 and 11 are diagrams illustrating an effective reflection attenuation amount calculated based on the first definition and the second definition, respectively. The vertical axis is the effective reflection attenuation amount and the horizontal axis is the gap amount (gap interval d) of the optical fiber connection portion X. The test wavelength is three wavelengths at 1310 nm, 1550 nm, and 1625 nm. Other conditions are the same as in FIGS. 8 and 9.

It can be seen from the results of FIG. 10 and FIG. 11 that even if the gap interval is at any value, the ranges in which the values of the effective reflection attenuation amount with respect to the filled material of refractive index matching agent, water, and air do not overlap without depending on the gap interval. Thus, it is possible to determine whether the gap of the optical fiber connection portion X is normally filled with a refractive index matching agent or replaced with water or air, from the value of the effective reflection attenuation amount. For example, if the effective reflection attenuation amount is not less than 35 dB, the gap of the optical fiber connection portion X is determined to be filled with refractive index matching agent. If the effective reflection attenuation amount is greater than or equal to 20 dB and less than 35 dB, the gap of the optical fiber connection portion X is determined to be filled with water. If the effective reflection attenuation amount is less than 20 dB, the gap of the optical fiber connection portion X is determined to be filled with air.

Other Embodiments

Note that the present invention is not limited to the above-described embodiments, and can be variously modified and implemented within the scope not departing from the gist of the present invention. In short, the present invention is not limited to the above-described embodiment as it is, and can be embodied with the components modified within the scope not departing from the gist thereof when implemented. Various inventions can be formed by appropriate combinations of a plurality of components disclosed in the above-described embodiment. For example, several components may be deleted from all of the components illustrated in the embodiment. Furthermore, components of different embodiments may be appropriately combined with each other.

REFERENCE SIGNS LIST 1-1 First light source
1-2 First optical bandpass filter
1-3 First light pulsing unit
1-4 Second light source
1-5 Second optical bandpass filter
1-6 Second light pulsing unit
1-7 Third light source
1-8 Third optical bandpass filter
1-9 Third light pulsing unit
1-10 Electrical pulse generation unit
1-11 to 1-13 Optical circulator
1-14, 1-15 Light switching unit
1-16 Light detector
1-17 A/D converter
1-18 Computation processor
301 Optical pulse test apparatus

The invention claimed is:

1. An optical pulse test apparatus comprising:
a light incident unit configured to input test optical pulses having predetermined spectral widths on one end of an optical fiber under test, the optical fiber under test including a connection portion at which optical fibers are connected to each other;
a light receiving unit configured to receive backscattered light by the test optical pulses from one end of the optical fiber under test and obtain a light intensity distribution with respect to a longitudinal direction of the optical fiber under test; and
a computation unit configured to calculate a reflection peak value caused by Fresnel reflection generated at the connection portion of the optical fiber under test from the light intensity distribution, and determine a type of medium at the connection portion of the optical fiber under test, based on the reflection peak value;
wherein the light incident unit sequentially inputs the test optical pulses having different center wavelengths on one end of the optical fiber under test, and the computation unit determines a type of medium at the connection portion of the optical fiber under test, based on an average value obtained by averaging the reflection peak values determined for each of the test optical pulses having different center wavelengths.

2. The optical pulse test apparatus according to claim 1, wherein the predetermined spectral widths are from several nm to several hundred nm.

3. An optical pulse test apparatus comprising:
a light incident unit configured to input test optical pulses having predetermined spectral widths on one end of an optical fiber under test, the optical fiber under test including a connection portion at which optical fibers are connected to each other;
a light receiving unit configured to receive backscattered light by the test optical pulses from one end of the optical fiber under test and obtain a light intensity distribution with respect to a longitudinal direction of the optical fiber under test; and
a computation unit configured to calculate a reflection peak value caused by Fresnel reflection generated at the connection portion of the optical fiber under test from the light intensity distribution, and determine a type of medium at the connection portion of the optical fiber under test, based on the reflection peak value;
wherein the light incident unit sequentially inputs the test optical pulses having different center wavelengths on one end of the optical fiber under test, and
the computation unit obtains reflectance data from the reflection peak values determined for each of the test optical pulses having different center wavelengths, and determines a type of medium at the connection portion of the optical fiber under test, based on a value obtained by logarithmically expressing a reciprocal of an average value obtained by averaging the reflectance data.

4. An optical pulse test apparatus comprising:
a light incident unit configured to input test optical pulses having predetermined spectral widths on one end of an optical fiber under test, the optical fiber under test including a connection portion at which optical fibers are connected to each other;
a light receiving unit configured to receive backscattered light by the test optical pulses from one end of the optical fiber under test and obtain a light intensity distribution with respect to a longitudinal direction of the optical fiber under test; and
a computation unit configured to calculate a reflection peak value caused by Fresnel reflection generated at the connection portion of the optical fiber under test from the light intensity distribution, and determine a type of medium at the connection portion of the optical fiber under test, based on the reflection peak value;
wherein the light incident unit sequentially inputs the test optical pulses having different center wavelengths on one end of the optical fiber under test, and
the computation unit obtains reflectance data of the reflection peak values determined for each of the test optical pulses having different center wavelengths, and determines a type of medium at the connection portion of the optical fiber under test, based on a value obtained by logarithmically expressing a minimum value of the reflectance data.

5. An optical pulse test method comprising:
inputting test optical pulses having predetermined spectral widths on one end of an optical fiber under test, the optical fiber including a connection portion at which optical fibers are connected to each other;
receiving backscattered light by the test optical pulses from one end of the optical fiber under test and obtaining a light intensity distribution with respect to a longitudinal direction of the optical fiber under test; and
calculating a reflection peak value caused by Fresnel reflection generated at the connection portion of the optical fiber under test from the light intensity distribution to determine a type of medium at the connection portion of the optical fiber under test, based on the reflection peak value;
wherein the test optical pulses having different center wavelengths are, in the inputting, sequentially input on one end of the optical fiber under test, and
a type of medium at the connection portion of the optical fiber under test is determined, in the calculating, based on an average value obtained by averaging the reflection peak values determined for each of the test optical pulses having different center wavelengths.

6. The optical pulse test method according to claim 5, wherein the predetermined spectral widths are from several nm to several hundred nm.

* * * * *